No. 610,611. Patented Sept. 13, 1898.
P. A. SCHUMACHER.
HARROW.
(Application filed May 29, 1897.)
(No Model.)
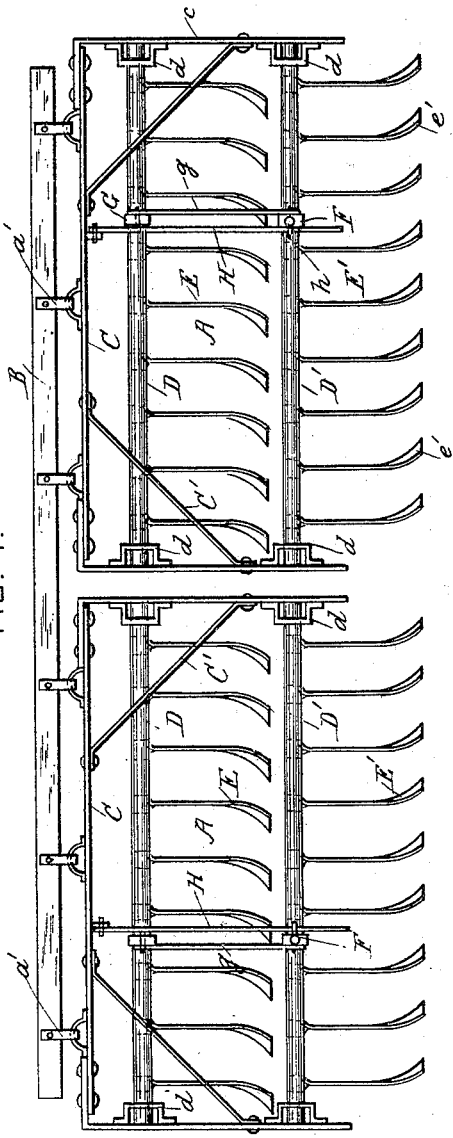
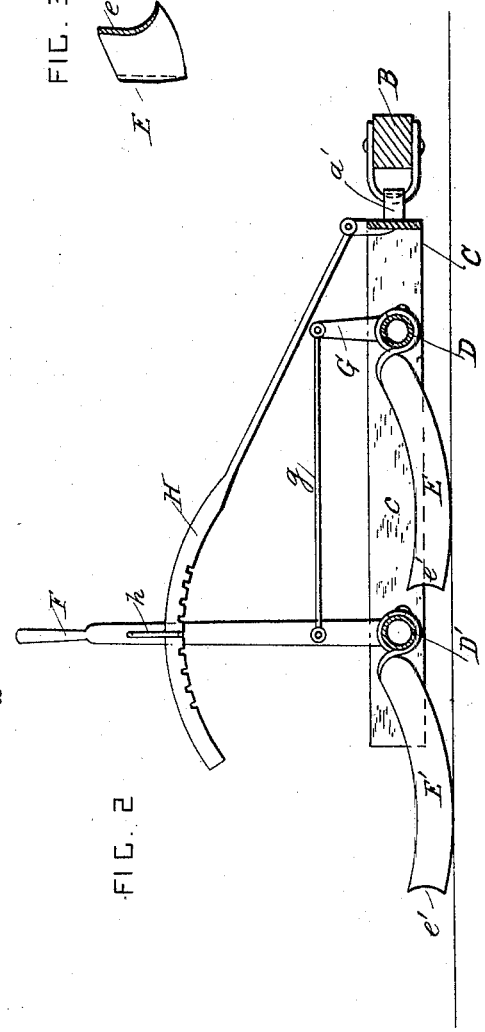
WITNESSES
INVENTOR
Peter A. Schumacher.
by Herbert W. T. Jenner.
Attorney

UNITED STATES PATENT OFFICE.

PETER A. SCHUMACHER, OF REYNOLDS, NORTH DAKOTA.

HARROW.

SPECIFICATION forming part of Letters Patent No. 610,611, dated September 13, 1898.

Application filed May 29, 1897. Serial No. 638,743. (No model.)

*To all whom it may concern:*

Be it known that I, PETER A. SCHUMACHER, a citizen of the United States, residing at Reynolds, in the county of Grand Forks and State of North Dakota, have invented certain new and useful Improvements in Harrows; and I do hereby declare the following to be a full, clear, and exact description of the invention, such as will enable others skilled in the art to which it appertains to make and use the same.

This invention relates to harrows; and it consists in the novel construction and combination of the parts hereinafter fully described and claimed.

In the drawings, Figure 1 is a plan view of the harrow. Fig. 2 is a cross-section taken on the line $x$ $x$ in Fig. 1. Fig. 3 is a cross-section through the tip of one of the knives.

The harrow is made in two or more similar sections A, and B is a beam, to which the said sections are pivoted by links $a'$. The beam B is drawn along in any approved manner. Each section of the harrow is provided with a frame C, which has sides $c$ and which is open at the rear.

$C'$ are braces secured diagonally to the front and sides of the frame.

D and $D'$ are tubular shafts which are journaled in bearings $d$, secured to the sides $c$. The shafts are made tubular, so that they may be very light and yet very stiff, and the sides $c$ prevent them from sliding endwise in their bearings. The bearings $d$ project inwardly from the sides $c$, and the braces $C'$ extend from the front portion of the frame diagonally across the front shaft D and are secured to the sides $c$ at points adjacent to the end portions of the rear shaft $D'$, so that the sides of the frame are prevented from spreading and both shafts are prevented from slipping out of the brackets $d$.

E and $E'$ are knives, the front ends of which are secured to the shafts D and $D'$ in any approved manner. The knives all have convex cutting edges $e$ extending along their under sides, and the tip $e'$ of each blade is concavo-convex in cross-section, so that it may cut more freely in the ground. The knives $E'$ are arranged behind the knives E. The rear parts of the knives E are curved or bent laterally in one direction, and the rear parts of the knives $E'$ are curved or bent in the reverse direction.

F is a handle secured to the rear shaft $D'$.

G is a lever which projects upward from the shaft D, and $g$ is a connecting-rod which pivotally connects the handle F with the lever G.

H is a notched rod which is pivoted to the frame C, and $h$ is a loop-catch carried by the handle F and engaging with the rod H.

When the harrow is drawn over the surface of the ground, it cuts and breaks up all the clods and does not slide laterally. The downward set of the knives and the depth of their cut are regulated by means of the handle, which is secured in position by the locking devices, comprising the notched rod and catch.

What I claim is—

In a harrow, the combination, with a frame provided with front and sides but open at the rear, of inwardly-projecting brackets $d$ secured to the said sides, shafts journaled in the said brackets with their ends abutting against the said sides, harrow-knives projecting rearwardly from the said shafts and having laterally-curved end portions, and diagonal braces preventing the said sides from being spread apart by the end thrust of the said shafts due to the lateral curvature of the said knives, substantially as set forth.

In testimony whereof I affix my signature in presence of two witnesses.

PETER A. SCHUMACHER.

Witnesses:
 A. B. HILLIARD,
 C. W. GOODRICH.